United States Patent
Teramoto et al.

(10) Patent No.: US 6,464,814 B2
(45) Date of Patent: Oct. 15, 2002

(54) METHOD FOR MOLDING AN END OF A LONG RESIN MOLDED ARTICLE

(75) Inventors: Yasunobu Teramoto, Nakashima-gun; Shinichi Goto, Ogaki; Tatsuo Ito, Yokkaichi; Hiroshi Mukai, Hashima; Hiroshi Iwasaki, Inazawa; Masahiro Nakatani, Nagoya, all of (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

(21) Appl. No.: 09/768,554

(22) Filed: Jan. 25, 2001

(65) Prior Publication Data

US 2001/0002610 A1 Jun. 7, 2001

Related U.S. Application Data

(60) Division of application No. 09/172,195, filed on Oct. 14, 1998, now abandoned, which is a continuation-in-part of application No. 08/826,166, filed on Mar. 27, 1997, now abandoned.

(30) Foreign Application Priority Data

Mar. 29, 1996 (JP) ................................. 8-77574

(51) Int. Cl.⁷ ........................ B29C 43/28; B29C 47/02; B29C 65/48; B29C 65/70; B29C 69/00
(52) U.S. Cl. .................. 156/199; 156/212; 156/244.17; 156/244.18; 264/479; 264/480; 264/486; 264/487; 264/148; 264/149; 264/171.14; 264/210.2; 264/291; 264/296; 425/174.8 R; 425/383; 425/394
(58) Field of Search ..................... 264/479, 480, 264/486, 487, 148, 149, 171.14, 210.2, 291, 296, 320, 322, 295, 339, 161; 425/174.8 R, 383, 394; 156/199, 212, 213, 244.17, 244.18

(56) References Cited

U.S. PATENT DOCUMENTS

| | | | | |
|---|---|---|---|---|
| 3,745,056 A | * | 7/1973 | Jackson | 428/157 |
| 4,034,057 A | | 7/1977 | Acda | 264/297.5 |
| 4,115,496 A | | 9/1978 | Krall | 264/533 |
| 4,250,612 A | * | 2/1981 | Narita | 264/154 |
| 4,548,570 A | | 10/1985 | Hahn et al. | 425/141 |
| 4,873,045 A | * | 10/1989 | Fujita et al. | 156/244.24 |
| 5,108,681 A | * | 4/1992 | Cakmakci | 156/267 |
| 5,227,108 A | * | 7/1993 | Reid et al. | 156/211 |
| 5,326,354 A | | 7/1994 | Kwarteng | 427/2.24 |
| 5,338,497 A | * | 8/1994 | Murray et al. | 264/257 |
| 5,358,680 A | | 10/1994 | Boissonnat et al. | 264/177.2 |
| 5,385,703 A | * | 1/1995 | Shanok et al. | 264/145 |
| 5,419,863 A | * | 5/1995 | Henderson | 156/211 |
| 5,503,432 A | | 4/1996 | Goode | 280/819 |
| 5,705,236 A | * | 1/1998 | Eraybar et al. | 428/120 |
| 5,709,912 A | * | 1/1998 | Goto et al. | 156/244.11 |

* cited by examiner

Primary Examiner—Ian H. Silbaugh
Assistant Examiner—Michael I. Poe
(74) Attorney, Agent, or Firm—Pillsbury Winthrop LLP

(57) ABSTRACT

A method for molding an end of a long resin molded article that is obtained by extrusion molding and has a design surface and an attachment surface extended in a longitudinal direction of the long resin molded article, and the attachment surface is attached to other parts. An end portion of the long resin molded article is heated so as to soften the end portion of the long resin molded article. The design surface of the heated end portion is pressed so as to stretch resin on a side of the design surface thereby forming an inclined surface on the end portion, whereby the end portion is inclined from the design surface at the end portion to said attachment surface at the end portion along said inclined surface. The attachment surface of the heated end portion is pressed so as to form a cavity on the attachment surface and stretch resin on a side of the attachment surface. In the processing, the resin on the design surface side is stretched to a substantially equal degree to the resin on the attachment surface side.

9 Claims, 10 Drawing Sheets

METHOD FOR MOLDING AN END OF A LONG RESIN MOLDED ARTICLE

CROSS REFERENCE TO RELATED APPLICATIONS

This is a divisional of application Ser. No. 09/172,195, filed Oct. 14, 1998, now abandoned, which is a CIP of Ser. No. 08/826,166 filed on Mar. 27, 1997, now abandoned.

BACKGROUND OF THE INVENTION

1. Field of the Invention

The present invention relates to a method for molding an end of a long resin molded article, and particularly to an end molding method in which a front surface of an end portion of a long resin molded article such as a side molding for an automobile, or the like, formed into a general sectional shape by extrusion molding is heated so as to be softened and further pressed into a predetermined shape such as an inclination shape toward a rear surface, or the like.

2. Description of the Related Art

A conventional example of this type method for molding an end of a long resin molded article is a technique shown in FIGS. 15 and 16(a) to 16(c). FIG. 15 is an explanatory view showing a heating step in a conventional method for molding an end of a long resin molded article. FIGS. 16(a) to 16(c) are explanatory views showing a pressing step in the conventional method for molding an end of a long resin molded article. FIG. 16(a) shows a state in which a long resin is disposed in press molds; FIG. 16(b) shows a state in which the end portion of the long resin is pressed by the press molds; and FIG. 16(c) shows a state in which rebounding occurs in an end portion of a long resin molded article obtained by pressing the long resin after evaluation of heat resistance.

This technique is provided to obtain a desired long resin molded article, for example, a finished product such as a side molding for an automobile, or the like, by a molding method in which an end portion of a long resin is heated so as to be softened and further pressed into a predetermined shape, that is, by a so-called hot press method. As shown in FIG. 15, in this technique, an end portion 2 (a left end portion in FIG. 15) of a long resin 1 obtained by extrusion-molding a resin such as polyvinyl chloride (PVC), polyolefins such as polypropylene (PP), polyethylene or the like, thermoplastic elastomer (TPO), vinyl acetate or the like and then cutting the end portion of the long resin obliquely at a predetermined position is concentratedly heated so as to be softened between electrodes 11 and 12 of a high frequency induction heating machine. Then, as shown in FIGS. 16(a) to 16(c), the end portion 2 of the long resin 1 which is softened by heating is pressed to form a predetermined sectional shape in which the end portion 2 is inclined from the front surface side to the rear surface side (from the upper side to the lower side in FIGS. 16(a) to 16(c)), so that a long resin molded article having a predetermined end shape can be obtained. Hereupon, the front surface serves as a design surface which is exposed outside, and the rear surface serves as an attachment surface which is attached to other parts such as an automobile door.

To perform such hot press molding, there are conventionally used press molds composed of an upper mold 15 having a press surface 15a corresponding to a design surface of the long resin molded article, and a lower mold 16 having a press surface 16a corresponding to the rear surface of the long resin molded article. After the steps of extrusion molding a resin, cutting the resin into a predetermined length and heating the end portion of the cut resin, the heated end-portion 2 of the long resin 1 is pressed while being held between the press surfaces 15a and 16a of the upper and lower molds 15 and 16 respectively to there by obtain a predetermined end shape as described above. Incidentally, escape cavities 15b and 16b are formed in the upper and lower molds 15 and 16 respectively so as to serve as portions for making a surplus resin R escape after hot pressing the end portion 2 of the long resin 1, so that the surplus resin R is reserved in the escape cavities so that such surplus resin R never exerts influence on the quality of external appearance of the final product.

Because the conventional method for molding an end of a long resin molded article is configured as described above, residual stress is generated in the inside of the end portion 2 with the plastic deformation of the end portion 2 of the long resin 1 by hot pressing. For example, as shown in FIG. 16(c), there is the possibility that disadvantages such as rebounding of the end portion 2A in a direction (upward in the drawing) reverse to the pressing direction, or the like, may occur after evaluation of heat resistance of the long resin molded article 1A.

Furthermore, conventionally, an insert of a metal such as aluminum, or the like, may be longitudinally embedded in the inside of the long resin molded article such as a side molding, or the like, for the purpose of increasing stiffness, or the like. When the end portion 6 (the right end portion in the drawing) of the long resin 5 having such an insert 7 embedded therein is to be molded into a predetermined shape by a hot press method as shown in FIGS. 17 (a) and 17 (b), the end portion 6 is first concentratedly heated by a high frequency induction heating machine as shown in FIG. 15. In this case, as shown in FIG. 17(b), there is, however, the possibility that the end portion 6 of the long resin 5 is melted and contracted by high frequency induction heating so that the insert 7 may be exposed from an end surface of the long resin 5 by heating. In this case, sparks may be generated between the electrodes 11, 12 of the high frequency induction heating machine and the insert 7 by high frequency induction heating, so that there is the possibility that pressing operation after that may be made difficult because the high frequency induction heating machine may stop before the temperature of the end portion 6 of the long resin 5 reaches a press-enabled point.

SUMMARY OF THE INVENTION

It is an object of the present invention to provide a method for molding an end of a long resin molded article, in which disadvantages such as rebounding of an end portion, or the like, are prevented in evaluation of heat resistance, or the like, after molding.

It is another object of the present invention to provide a method for molding an end of a long resin molded article, in which a heating operation can be performed smoothly even in the case where an end portion of a long resin having an insert embedded therein is heated by high frequency induction heating.

The inventors of the present invention have made studies to find the reasons of the rebounding as shown in FIG. 16(c), and it the following facts were found:

(i) In the hot pressing step as shown in FIGS. 16(a) and 16(b), the end portion of the long resin molded article becomes inclined from the front surface to the rear surface. At this time, the resin of the front surface side is stretched largely by plastic deformation. On the other hand, the resin of the rear surface side is stretched very slightly. During the processing step, the resin of the front surface is plastically deformed to a greater degree than the resin of the rear surface. This difference in plastic deformation results in a residual stress F in the inside of the end portion as shown in FIG. 18. Thus generated residual stress is remained also after the hot pressing, and the residual stress is released by the gradual cooling after the evaluation of heat resistance as shown in FIG. 18. This stress release generates rebounding of the end portion.

(ii) Thermal shrinkage of resin in the thick portion of the end portion (area A in FIG. 18) is larger than that in the thin portion of the end portion (area B in FIG. 18), so that residual stress F shown in FIG. 18 is generated as similar to the above (i). It should be noted that if only at least one of the above factors (i) and (ii) is solved, it becomes possible to achieve the objects of the present invention. Although the rebounding of the end portion is based on the combination of the above (i) and (ii), if one of (i) and (ii) is solved, almost all of the other is also removed.

In a first aspect of the invention, a method is provided for molding an end of a long resin molded article, the long resin molded article having been obtained by extrusion molding and having a design surface and an attachment surface extended in a longitudinal direction of the long resin molded article, the attachment surface being attached to other parts, the method comprising the steps of: heating an end portion of the long resin molded article so as to soften the end portion of the long resin molded article; pressing the design surface of the heated end portion so as to stretch resin on a side of the design surface thereby forming an inclined surface on the end portion, whereby the end portion is inclined from the design surface at the end portion to the attachment surface at the end portion along the inclined surface; and pressing the attachment surface of the heated end portion so as to form a cavity on the attachment surface and stretch resin on a side of the attachment surface, wherein the resin on the side of the design surface is stretched to a substantially equal degree to the resin on the side of the attachment surface.

In a second aspect of the invention, a method is provided for molding an end of a long resin molded article, the long resin molded article having been obtained by extrusion molding and having a design surface and an attachment surface extended in a longitudinal direction of the long resin molded article, the attachment surface being attached to other parts, the method comprising the steps of: heating an end portion of the long resin molded article so as to soften the end portion of the long resin molded article; embedding a piece having a convex surface in the attachment surface of the heated end portion while forming a cavity on the attachment surface so as to bond the convex surface of the piece to the cavity; and pressing the design surface of the heated end portion thereby forming an inclined surface on the end portion, whereby the end portion is inclined from the design surface at the end portion to the attachment surface at the end portion along the inclined surface, wherein a shape of the inclined surface is substantially same as a shape of the convex surface of the piece. In a third aspect of the invention, a method is provided for molding an end of a long resin molded article, the long resin molded article having been obtained by extrusion molding and having a design surface and an attachment surface extended in a longitudinal direction of the long resin molded article, the attachment surface being attached to the parts, the method comprising the steps of: forming a lightened portion at least in the attachment surface of an end portion of the long resin molded article so that the lightened portion extends in a longitudinal direction of the long resin molded article; heating the end portion of the long resin molded article so as to soften the end portion of the long resin molded article; and pressing the heated end portion of the long resin molded article so that the end portion is inclined from the design surface to the attachment surface thereof.

In a fourth aspect of the invention, a method is provided for molding an end of a long resin molded article comprising the steps of: extrusion molding the ling resin molded article having a metal insert longitudinally continuously embedded; cutting the long resin molded article into a predetermined length; sealing a portion of an end portion of the cut long resin molded article corresponding to an end portion of the insert with a sealing material; heating the end portion of the long resin molded article; and pressing the heated end portion of the long resin molded article to a predetermined shape. The invention has been described in Japanese Application No. 8-77574, filed Mar. 29, 1996, the entire contents of which are incorporated herein by reference.

DETAILED DESCRIPTION OF THE PREFERRED EMBODIMENTS

Embodiments of the present invention will be described below.

Figure 1A:
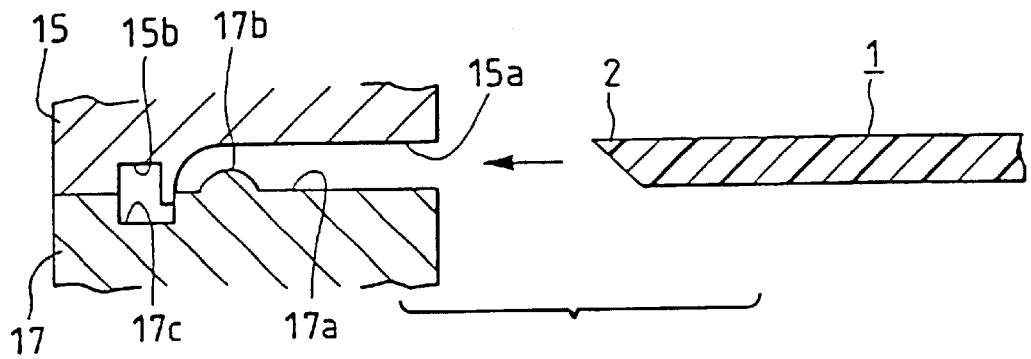
FIGS. 1(*a*) to 1(*c*) are explanatory views showing a pressing step in a method for molding an end of a long resin molded article according to a first embodiment of the present invention.
Figure 1B:
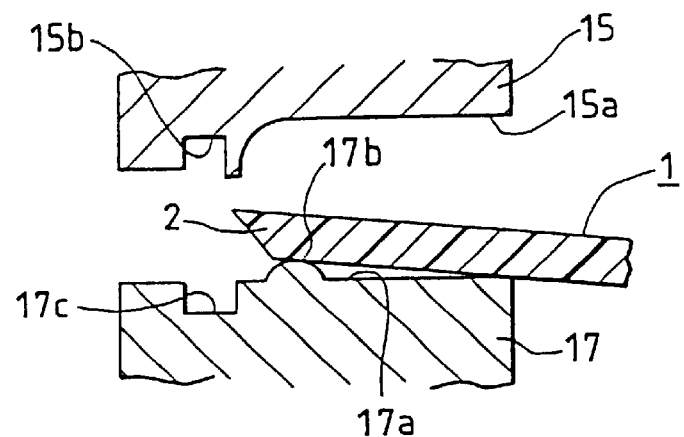
Figure 1C:
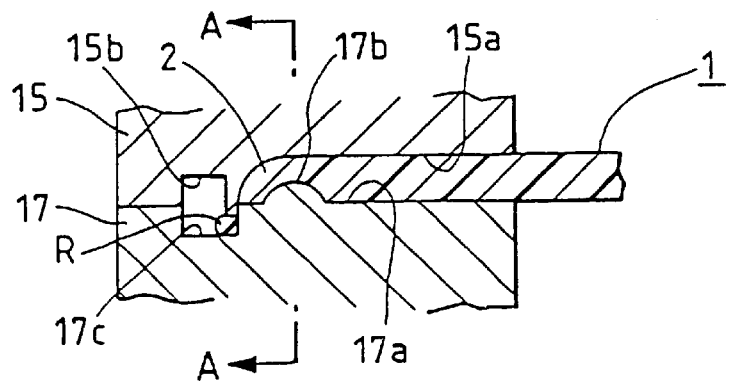
Figure 2:
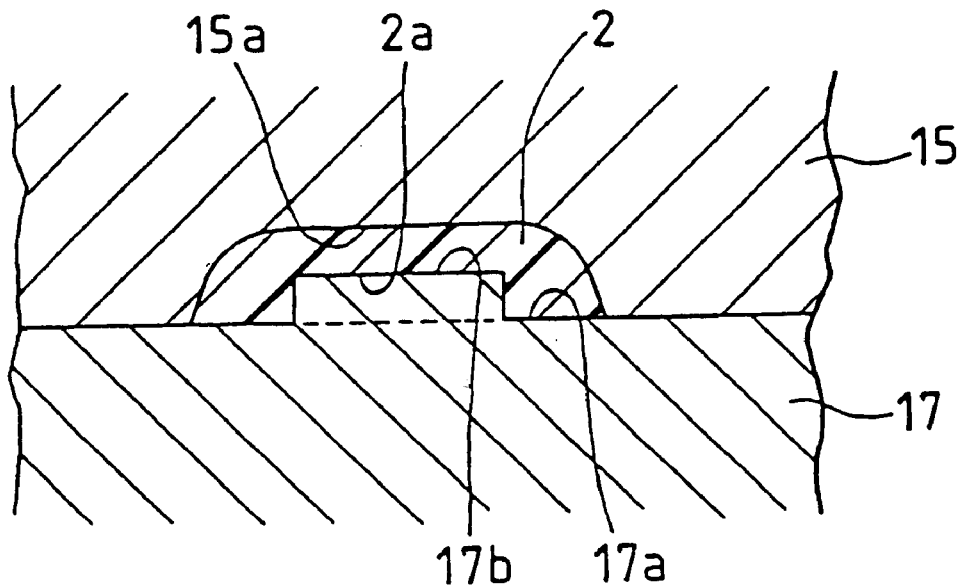
FIG. 2 is a sectional view taken along the line A—A in FIG. 1(*c*)
Figure 3:
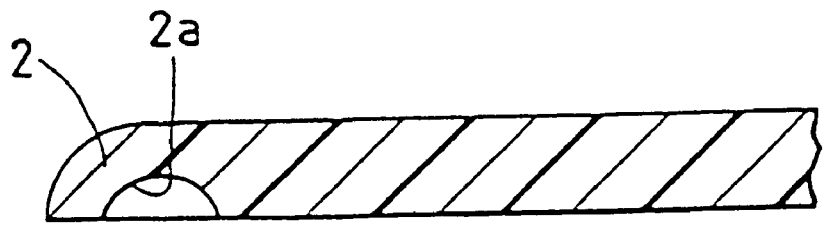
FIG. 3 is a sectional view showing the end portion of the long resin molded article which is molded by the method for molding an end of a long resin molded article according to the first embodiment of the present invention.

FIGS. 1(a) to 1(c) are explanatory views showing a pressing step in a method for molding an end of a long resin molded article according to a first embodiment of the present invention. FIG. 1(a) shows a state in which an end portion of a long resin is not yet disposed in press molds; FIG. 1(b) shows a state in which the end portion of the long resin is already disposed in the press molds; and FIG. 1(c) shows a state in which the end portion of the long resin is pressed. FIG. 2 is a sectional view taken along the line A—A in FIG. 1(c). FIG. 3 is a sectional view showing the end portion of the long resin molded article produced by the method for molding an end of a long resin molded article according to the first embodiment of the present invention.

It is noted that in the drawings constituent parts which are the same as or equivalent to those in the conventional art are referenced correspondingly, and the duplication of description bout those parts will be omitted hereafter.

First, press molds used in the method for molding an end of a long resin molded article in this embodiment will be described.

As shown in FIGS. 1(a) to 1(c) and 2, the press molds, like those in the conventional art, are composed of an upper mold 15 and a lower mold 17. The upper mold 15 has the same construction as the upper mold 15 of the conventional press molds, that is, the upper mold 15 has a press surface 15a having a shape corresponding to a design surface of the end portion of the long resin molded article. That is, the press surface 15a of the upper mold 15 has a curved shape in which the press surface 15a is inclined from the front surface of the end portion of the long resin molded article to the rear surface thereof. The front surface serves as a design surface which is exposed outside, and the rear surface serves as an attachment surface which is attached to other parts such as an automobile door. On the other hand, the lower mold 17 of the press molds in this embodiment has a first press surface 17a which is flat so as to be used for forming a flat surface as a general shape of the rear surface of the long resin molded article, and a second press surface 17b which is integrally formed in a position of an end portion (left end portion in the drawing) of the first press surface 17a corresponding to the end portion 2 of the long resin 1. The second press surface 17b is shaped like a semicolumn obtained by dividing a column into two. That is, as shown in FIGS. 1(a) to 1(c), the second press surface 17b is designed so as to have a section like a semicircular convex in the longitudinal direction (the left-right direction in FIGS. 1(a) to 1(c)) of the long resin 1. The left half portion of the semicircular convex section has a circular arc-shaped surface which extends substantially in parallel with the curved surface (vertical sectional shape) of the end of the press surface 15a of the upper mold 15 with a predetermined distance from the curved surface. Further, as shown in FIG. 2, the second press surface 17b is designed so as to have a section, in the widthwise direction (the left-right direction in FIG. 2) of the long resin 1, like an oblong which extends substantially in parallel with the horizontal sectional shape of the press surface 15a of the upper mold 15 with a predetermined distance from the horizontal sectional shape.

The method for molding an end of a long resin molded article in this embodiment will be described below.

First, an end portion 2 (a left end portion in FIG. 1) of a long resin 1 obtained by extrusion-molding a resin such as polyvinyl chloride (PVC), polyolefins such as polypropylene (PP), polyethylene or the like, thermoplastic elastomer (TPO), vinyl acetate or the like is cut obliquely at a predetermined position. Then, the end portion 2 of the long resin 1 is concentratedly heated by high frequency induction heating so as to be melted or softened in the same manner as in the conventional art shown in FIG. 15. Then, in a pressing step, the heated and softened end portion 2 of the long resin 1 is pressed not only to form the front surface of the end portion 2 into a predetermined curved shape in which the front surface curves or tapers toward the rear surface (a curvedly inclined surface inclined from the front surface to the rear surface is formed on the end portion) but also to form a cavity 2a having a shape corresponding to the shape of the aforementioned front surface (curvedly inclined surface) in the rear surface to thereby form an end shape. By this pressing step, not only the resin of the front surface side is stretched, but also the resin of the rear surface side is stretched. Hereupon, the resin of the front surface side is stretched to a substantially equal degree to the resin of the rear surface side. That is, as shown in FIGS. 1(a) and 1(b), in the pressing step in this embodiment, the press molds are opened so that the upper mold is separated from the lower mold 17 in order to place the heated and softened end portion 2 of the long resin 1 in a predetermined position in the lower mold 17. It is noted that the end portion 2 of the long resin 1 is disposed so that not only is the longitudinal end of the long resin 1 slightly projected from the first press surface 17a of the lower mold 17 so as to be located above the reservoir cavity 17c but also the second press surface 17b of the lower mold 17 is located substantially in the widthwise center of the long resin 1. Then, as shown in FIG. 1(c) and in FIG. 2, the upper mold 15 is driven to come close to the lower mold 17 so as to perform mold closing so that the end portion 2 of the long resin 1 is pressed while it is held between the press surface 15a of the upper mold 15 and the first and second press surfaces 17a, 17b of the lower mold 17.

As a result, the front surface of the end portion 2 of the long resin 1 is pressed by the press surface 15a of the upper mold 15 so as to be formed into a shape corresponding to the shape of a design surface of the long resin molded article. On the other hand, the rear surface of the end portion 2 of the long resin 1 is designed so that the second press surface 17b of the lower mold 17 is embedded therein to form a semicolumnar cavity 2a corresponding to the second press surface 17b. As shown in FIG. 1 (c), cavity 2a is designed so as to have a section like a semicircular cavity in the longitudinal direction (the left-right is direction in FIGS. 1 (a) to 1 (c)) of long resin 1. The end surface (the left surface in FIGS. 1(a) to 1(c)) of the end portion 2 has a circular arc-shaped surface which extends so as to be curved substantially in parallel with the vertical sectional shape of the design surface of the end portion of the long resin molded article. In other words, the thickness of the end portion is substantially constant at a part corresponding to the curvedly inclined surface of the front surface. Further, as shown in FIG. 2, the cavity 2a is designed so as to have a section, in the widthwise direction (the left-right direction in FIG. 2) of the long resin 1, like an oblong substantially corresponding to the horizontal sectional shape of the design surface of the end portion of the long resin molded article. Incidentally, the first press surface 17a of the lower mold 17 supports the rear surface of the long resin 1 at the time of pressing in order to stabilize the shaping of the cavity 2a, or the like, without any contribution to the shaping of the end portion 2 of the long resin 1. Further, the surplus resin R at the time of pressing is reserved in the escape cavities 15b and 17c in the same manner as in the conventional art, so that the surplus resin R never exerts influence on the quality of external appearance in the design surface, or the like, in the long resin molded article which is a final product.

After pressing molding, the end portion 2 of the long resin 1 is cooled and solidified to obtain a long resin molded article having the cavity 2a formed in the rear surface thereof. At the time of cooling, the end portion 2 of the long resin 1 is designed so that the front surface as the design surface is substantially parallel with the left half portion of the cavity 2a of the rear surface. That is, the thickness of a part of the end portion corresponding to the curvedly inclined surface of the front surface and the left half portion of the cavity 2a is substantially constant as aforementioned. Further, the degree of the stretch on the resin of the front surface side is substantially equal to that of the resin of the rear surface side. Accordingly, the front surface and rear surface of the end portion 2 of the long resin I are cooled and solidified at a uniform speed, so that the contraction of the resin caused by cooling occurs evenly. Accordingly, the end portion 2 of the long resin 1 is never bent toward either one of the front and rear surfaces by the cooling.

As described above, the method for molding an end of a long resin molded article in the aforementioned embodiment comprises the steps of: heating an end portion 2 of a long resin 1 obtained by extrusion molding; and pressing the heated end portion 2 of the long resin 1 not only to form the front surface of the end portion 2 into a predetermined shape in which the front surface curves or angles toward the rear surface but also to form a cavity 2a having a shape corresponding to the shape of the front surface in the rear surface to thereby form an end shape so that the front surface is stretched by substantially equal stretch degree to the rear surface.

Accordingly, in the aforementioned embodiment, the end portion 2 of the long resin 1 is heated and softened in the heating step so that the end portion 2 can be pressed into a predetermined shape. Further, the heated and softened end portion 2 of the long resin 1 is pressed in the pressing step not only to form the front surface into a predetermined shape in which the front surface goes toward the rear surface but also to form a cavity 2a having a shape corresponding to the shape of the front surface in the rear surface to thereby form an end shape so that the thickness of a part of the end portion corresponding to the curvedly inclined surface of the front surface and the left half portion of the cavity 2a is substantially constant and the stretch degree of the resin of the front surface side is substantially equal to that of the resin of the rear surface side. Accordingly, the residual distortion in the front surface of the long resin molded article is substantially the same as the residual distortion in the rear surface thereof, so that the residual stress in the front surface and the residual stress in the rear surface offset each other. As a result, for example, even in the evaluation of heat resistance, or the like, after molding, a long resin molded article excellent and stable in quality can be produced without the occurrence of any disadvantage such as rebounding of the end portion 2 which is considered to be caused by the residual stress in the press-molded end portion.

Other embodiments of the present invention will be described below. In the descriptions of the further embodiments, only the points of difference of each embodiment from the first embodiment will be described. That is, in those embodiments, the constituent parts the same as those in the first embodiment is referenced correspondingly in the drawings and the description about them will be omitted.

Figure 4:
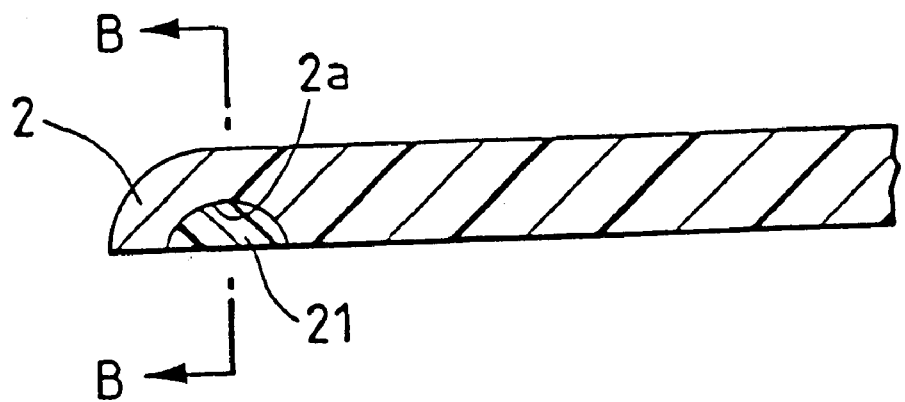
FIG. 4 is a sectional view showing an end portion of a long resin molded article which is produced by a method for molding an end of a long resin molded article according to a second embodiment of the present invention.
Figure 5:
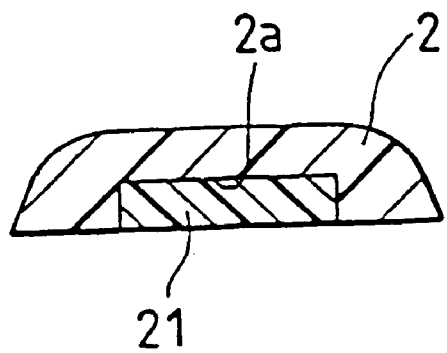
FIG. 5 is a sectional view taken along the line B—B in FIG. 4.

FIG. 4 is a sectional view showing an end portion of a long resin molded article produced by a method for molding an end of a long resin molded article according to a second embodiment of the present invention. FIG. 5 is a sectional view taken along the line B—B in FIG. 4.

As shown in FIGS. 4 and 5, this embodiment is designed so that a bonding piece 21 having the same shape as that of the cavity 2a of the end portion 2 of the long resin molded article molded by the method for molding an end of a long resin molded article according to the first embodiment is bonded to the cavity 2a. This embodiment has the same construction as the first embodiment except the bonding piece 21. The bonding piece 21 may be formed from the same resin material as the resin material of the long resin 1 or may be formed from another resin material. After the long resin molded article according to the first embodiment is molded, the bonding piece 21 is integrally bonded to the cavity 2a of the rear surface of the end portion 2 by an adhesive agent, or the like.

As described above, the method for molding an end of a long resin molded article in this embodiment further comprises, in addition to the construction of the first embodiment, the step of filling the cavity 2a of the rear surface of the end portion 2 of the long resin 1 with a convex bonding piece 21 having a shape corresponding to the shape of the cavity 2a bonded to the cavity 2a after the pressing step and the cooling step.

Accordingly, in this embodiment, in addition to the operation and effect of the first embodiment, when, for example, this embodiment is specifically applied to a side molding for an automobile, the bonding piece 21 bonded to the cavity 2a of the end portion 2 can be used as means for supporting a pressure sensitive adhesive double coated tape to be stuck to a vehicle body, so that the adhesive force of the side molding to the vehicle body can be increased. Furthermore, there arises an effect that the strength of the end portion 2 of the long resin molded article can be increased by the bonding piece 21.

Figure 6A:
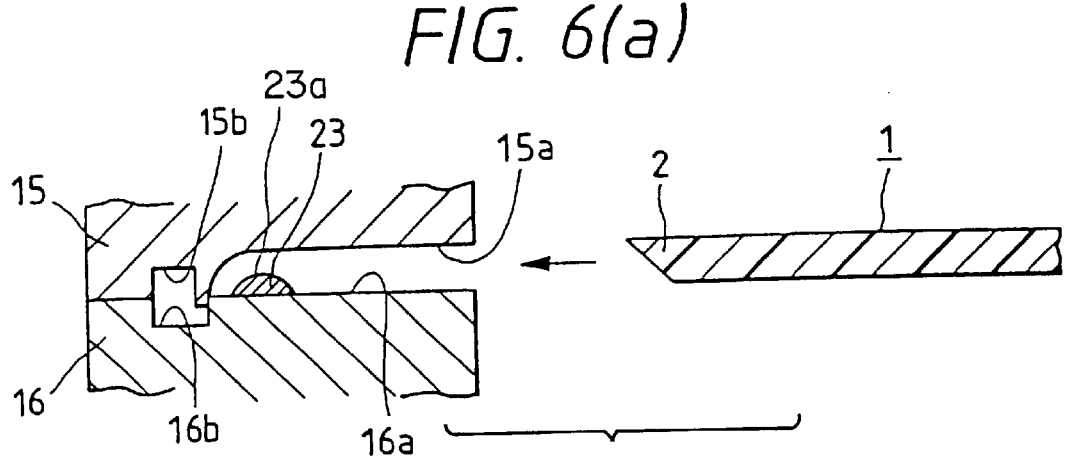
FIGS. 6(*a*) to 6(*c*) are explanatory views showing a pressing step in a method for molding an end of a long resin molded article according to a third embodiment of the present invention.
Figure 6B:
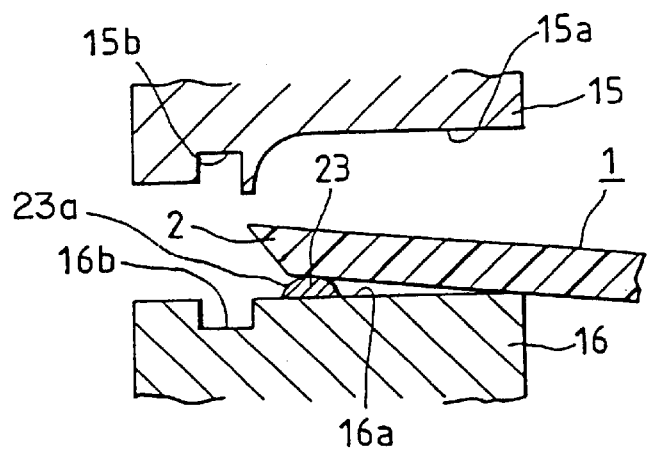
Figure 6C:
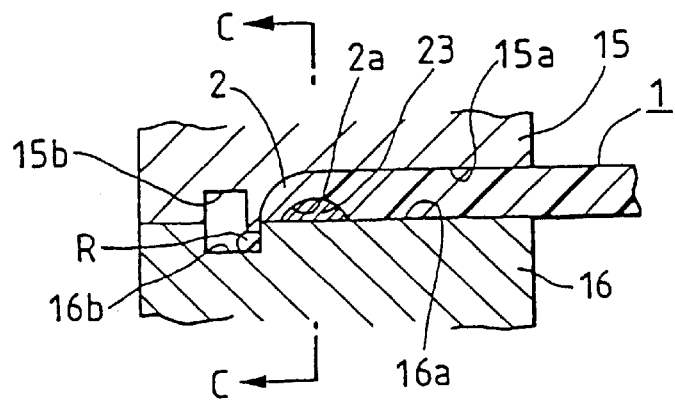
Figure 7:
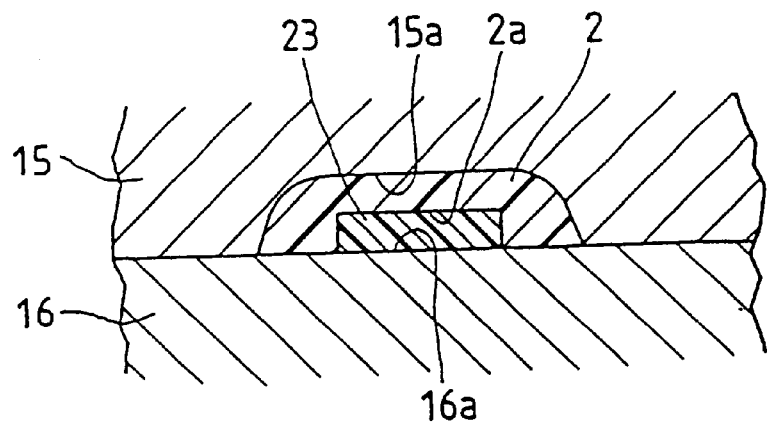
FIG. 7 is a sectional view taken along the line C—C in FIG. 6(*c*)

FIGS. 6(a) to 6(c) are explanatory views showing a pressing step in a method for molding an end of a long resin molded article according to a third embodiment of the present invention. FIG. 6(a) shows a state in which an embedding piece is disposed on a press surface of a lower mold before an end portion of a long resin is disposed in press molds; FIG. 6(b) shows a state in which the end portion of the long resin is disposed in the press molds; and the diagram (c) of FIG. 6 shows a state in which the end portion of the long resin is pressed. FIG. 7 is a sectional view taken along the line C—C in FIG. 6(c).

The method for molding an end of a long resin molded article according to the embodiment illustrated in FIGS. 6(a) to 6(c) and 7 is based on the same theory as in the first embodiment, but the second press surface 17b of the lower mold 17 of the press molds in the first embodiment is replaced by an embedding piece 23 having the same shape as the second press surface 17b. That is, in the method for molding an end of a long resin molded article according to this embodiment, the same press molds as in the conventional art are used so that the lower mold 16 has not the same first and second press surfaces 17a and 17b as in the first embodiment but has the same single press surface 16a as in the conventional art. The embedding piece 23 used in the method for molding an end of a long resin molded article according to this embodiment is shaped substantially like a semicolumn obtained by dividing a column into two in the same manner as in the second press surface 17b of the lower mold 17 in the first embodiment. That is, as shown in FIGS. 6(a) to 6(c), the embedding piece 23 is designed so as to a section like a semicircular convex in the longitudinal direction (the left-right direction in FIGS. 6(a) to 6(c)) of the long resin 1. The section forms a circular arc-shaped surface which extends substantially in parallel with the curved surface (vertical sectional shape) of the end of the press surface 15a of the upper mold 15 with a predetermined distance from the curved surface (at the left half side of the embedding piece 23). Further, as shown in FIG. 7, the embedding piece 23 is designed so as to have a section, in the widthwise direction (the left-right direction in FIG. 7) of the long resin 1, like an oblong which extends substantially in parallel with the horizontal sectional shape of the press surface 15a of the upper mold 15 with a predetermined distance from the horizontal sectional shape of the press surface 15a.

The method for molding an end of a long resin molded article according to this embodiment will be described below.

Figure 15:
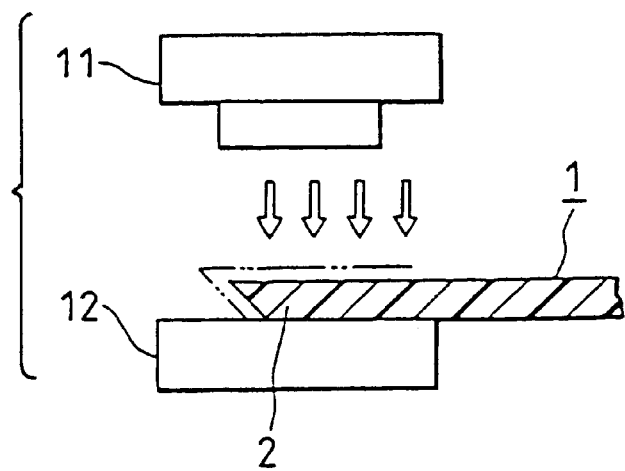
FIG. 15 is an explanatory view showing a heating step in a conventional method for molding an end of a long resin molded article.
Figure 16A:
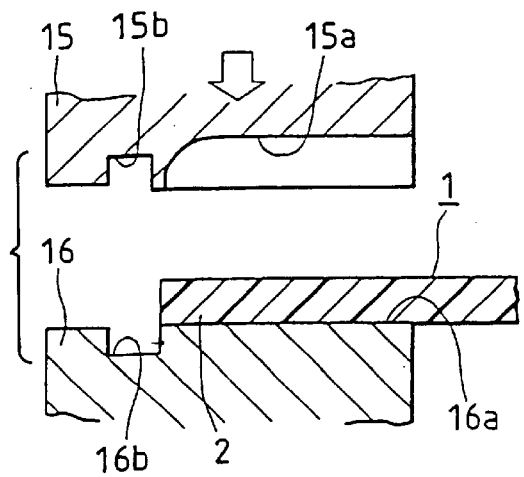
FIGS. 16(a) to 16(c) are explanatory views showing a pressing step in the conventional method for molding an end of a long resin molded article.
Figure 16B:
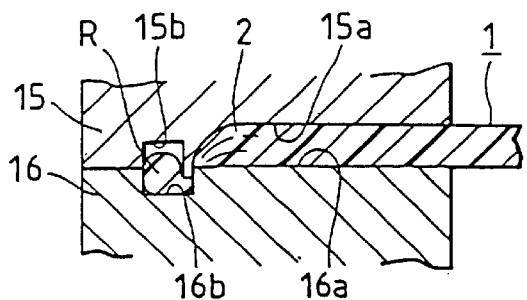
Figure 16C:
Figure 17A:
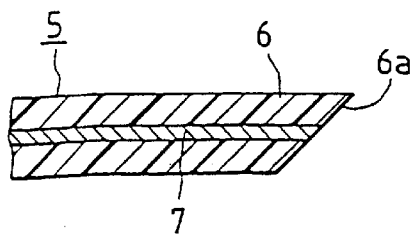
FIGS. 17(a) and 17(b) show the conventional method for molding an end of a long resin molded article.
Figure 17B:
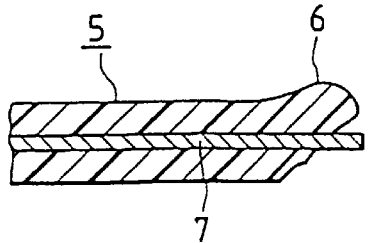
Figure 18:
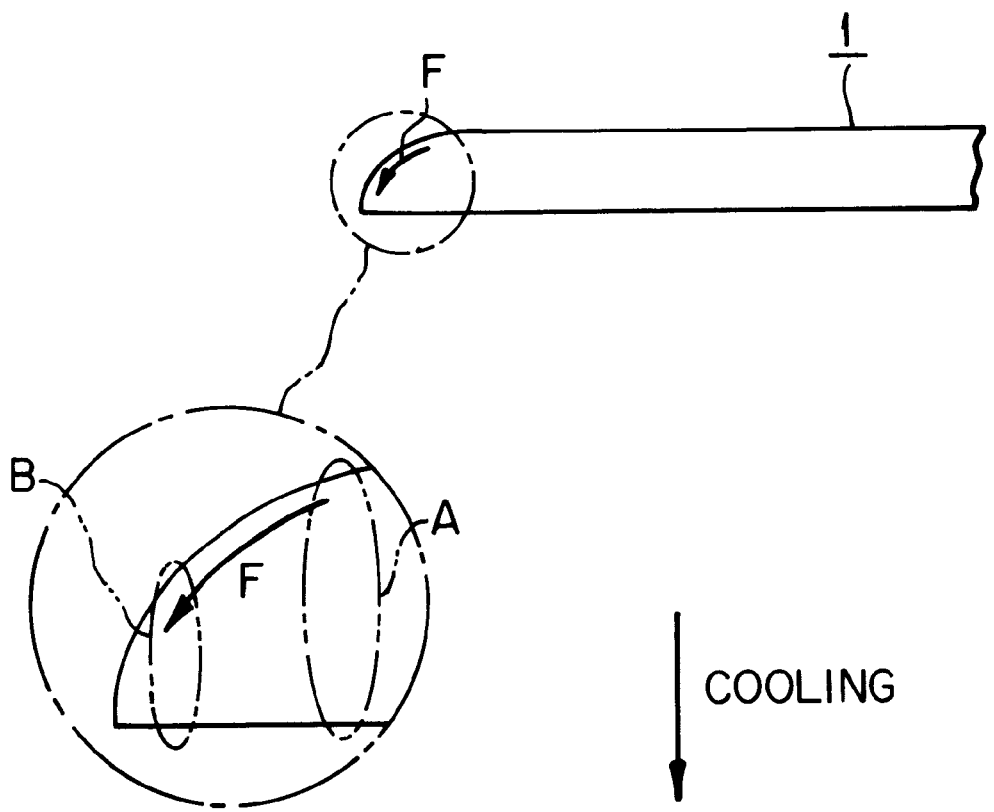
FIG. 18 shows a process of rebounding of the end portion of the conventional long resin molded article.
Figure 18:
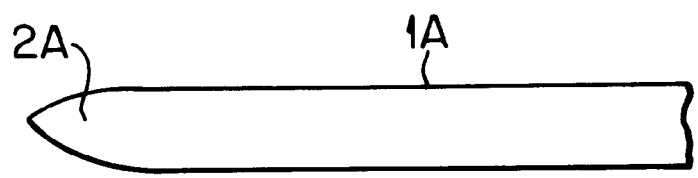

First, in the heating step in the method for molding an end of a long resin molded article according to this embodiment, the end portion 2 of the long resin 1 extrusion-molded into a predetermined general sectional shape is concentratedly heated by high frequency induction heating so as to be melted or softened in the same manner as in the conventional art shown in FIG. 15. Then, in the embedding-piece disposing step, as shown in FIG. 6(a), the embedding piece 23 having a convex surface corresponding to the front surface of the end portion 2 after pressed is disposed in position on the press surface 16a of the lower mold 16 to which the rear surface of the heated end portion 2 of the heated long resin 1 comes. Then, in the pressing step, the heated and softened end portion 2 of the long resin 1 is pressed to embed the embedding piece 23 in the rear surface of the end portion 2 to thereby form an end shape so that the length of the front surface of the end portion 2 (length of the curvedly inclined surface of the front surface in the longitudinal direction of the long resin molded article) is substantially equal to the length of a top surface 23a of the embedding piece 23 in the longitudinal direction of the long resin molded article. That is, in the embedding piece arranging step in this embodiment, the embedding piece 23 is put on the press surface 16a of the lower mold 16 so that the left circular arc-shaped surface corresponds to the design surface of the end portion 2 of the long resin molded article in the press surface 15a of the upper mold 15 and is disposed substantially in the widthwise center of the press surface 16a of the lower mold 16. Further, in the pressing step, as shown in FIGS. 6(a) and 6(b), the press molds are opened so that the upper mold 15 is separated from the lower mold 16 in order to put the heated and softened end portion 2 of the long resin 1 in a predetermined position of the lower mold 16. Incidentally, the end portion 2 of the long resin 1 is disposed so that the lengthwise end is slightly projected from the press surface 16a of the lower mold 16 so as to be located above the reservoir cavity 16b and that the embedding piece 23 comes substantially into the widthwise center of the end portion 2 of the long resin 1. Then, as shown in FIG. 6(c) and in FIG. 7, the upper mold 15 is driven to come close to the lower mold 16 so as to close the molds so that the end portion 2 of the long resin 1 is pressed while being held between the press surface 15a of the upper mold 15 and the press surface 16a of the lower mold 16.

As a result, the front surface of the end portion 2 of the long resin 1 is pressed by the press surface 15a of the upper mold 15 to form a shape corresponding to the design surface of the long resin molded article. On the other hand, the rear surface of the end portion 2 of the long resin 1 is designed so that the embedding piece 23 is embedded therein to form a cavity 2a having a semicolumnar shape corresponding to the shape of the embedding piece 23. As shown in FIG. 6(c), the cavity 2a has the same shape as that of the cavity 2a in the first embodiment. That is, the cavity 2a is designed so as to have a section like a semicircular concave in the longitudinal direction (the left-right direction in FIGS. 6(a) to 6(c)) of the long resin 1. The end surface (the left surface in FIGS. 6(a) to 6(c)) of the end portion 2 is formed like a circular arc-shaped surface which extends so as to be curved substantially in parallel with the vertical sectional shape of the design surface of the end portion 2 of the long resin molded article. Further, as shown in FIG. 7, the cavity 2a is designed so as to have a section in the widthwise direction (the left-right direction in FIG. 7) of the long resin 1 is shaped like an oblong substantially corresponding to the horizontal sectional shape of the design surface of the end portion 2 of the long resin molded article. Incidentally, the surplus resin R at the time of pressing is reserved in the escape cavities 15b and 16b in the same manner as in the conventional art so that the surplus resin R never exerts influence on the quality of external appearance of the design surface, or the like, in the long resin molded article which is a final product.

Also in this embodiment, the resin of the front surface side is stretched to a substantially equal degree to the resin of the rear surface side, and the thickness of a part of the end portion corresponding to the curvedly inclined surface of the front surface and the left half portion of the cavity 2a is substantially constant as the first embodiment.

Incidentally, in this embodiment, a resin material capable of being bonded to the long resin 1 is used as the material for the embedding piece 23 so that the resin material is fusion-bonded to the cavity 2a of the end portion 2 of the long resin 1 in the heating step. Accordingly, in addition to the effect of the second embodiment, in the third embodiment there arises an effect that he cavity 2a of the end portion 2 of the long resin 1 can be filled at the same time that the pressing step is performed.

As described above, the method for molding an end of a long resin molded article according to the aforementioned embodiment is a method for molding an end of a long resin molded article, in which an end portion 2 of a long resin 1 obtained by extrusion molding is pressed by hot press to form the front surface into a predetermined shape in which the front surface goes toward the rear surface. The method comprises the steps of: heating the end portion 2 of the long resin 1; arranging the embedding piece 23 having a convex surface (top surface 23a) corresponding to the front surface of the end portion 2 after pressing in the rear surface of the heated end portion 2 of the long resin 1; pressing the end portion 2 of the long resin 1 not only to embed the embedding piece 23 in the rear surface of the end portion 2 but also to form an end shape so that the length of the front surface of the end portion 2 (length of the curvedly inclined surface in the longitudinal direction of the long resin molded article) is substantially equal to the length of the top surface 23a of the embedding piece 23 in the longitudinal direction of the long resin molded article embedded as described above.

Accordingly, in the aforementioned embodiment, the end portion 2 of the long resin 1 is heated and softened in the heating step into a state where the end portion 2 can be pressed into a predetermined shape. Then, the embedding piece 23 is disposed in a predetermined position in the embedding piece arranging step and the heated and softened end portion 2 of the long resin 1 is pressed in the pressing step not only to form the front surface into a predetermined shape in which the front surface goes toward the rear surface but also to form a cavity 2a having a shape corresponding to the shape of the front surface in the rear surface by the embedding piece 23 embedded in the rear surface to thereby form an end shape so that the length of the curvedly inclined surface of the front surface is substantially equal to the length of the cavity of the rear surface in the longitudinal direction of the long resin molded article. As a result, the residual distortion in the front surface of the long resin molded article is substantially the same as the residual distortion in the rear surface thereof, so that the residual stress in the front surface and the residual stress in the rear surface offset each other. As a result, a long resin molded article excellent and stable in quality can be produced without the occurrence of any disadvantage such as rebounding of the end portion 2, or the like. Furthermore, the cavity 2a of the end portion 2 of the long resin 1 is filled with the embedding piece 23. When, for example, this embodiment is applied to a side molding for an automobile, the embedded piece 23 embedded to the cavity 2a of the end portion 2 can be used as means for supporting a pressure sensitive adhesive double coated tape to be stuck to a vehicle body, so that the adhesive force of the side molding to the vehicle body can be increased. Furthermore, there arises an effect that the strength of the end portion 2 of the long resin molded article can be increased by the embedding piece 23.

Figure 8:
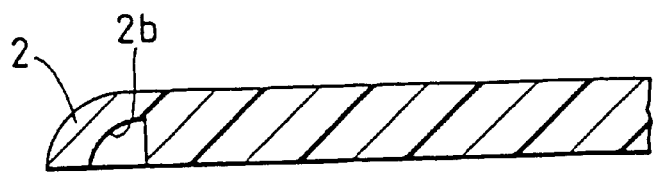
FIG. 8 is a sectional view showing an end portion of a long resin molded article which is molded by a method for molding an end of a long resin molded article according to a fourth embodiment of the present invention.

FIG. 8 is a sectional view showing an end portion of a long resin molded article molded by a method for molding an end of a long resin molded article according to a fourth embodiment of the present invention.

This embodiment has the same construction as the first embodiment, except that this embodiment is different from the first embodiment in the shape of the cavity formed in the rear surface of the end portion 2 of the long resin molded article. That is, the cavity 2b in this embodiment is shaped so as to have a section like a substantially quarter circular arc obtained by circumferentially dividing the cavity 2a of the first embodiment into two such that the left surface is formed to be a quarter circular arc-shaped surface which extends so as to be curved substantially in parallel with the vertical sectional shape of the design surface of the end portion 2 of the long resin molded article, while the right surface is formed to be a flat surface which extends in the crosswise direction of the long resin 1 (is perpendicular to the long dimension of the long resin 1). Further, the cavity 2b in this embodiment is designed so as to have a section in the widthwise direction of the long resin 1 shaped like an oblong substantially corresponding to the horizontal sectional shape of the design surface of the end portion 2 of the long resin molded article in the same manner as the cavity 2a in the first embodiment.

In this embodiment, the second press surface 17b of the lower mold 17 in the press molds in the first embodiment is replaced by a press surface having the same shape as that of the cavity 2b to thereby make it possible to perform molding of an end of a long resin molded article in the same manner as in the first embodiment. Further, the method for molding an end of a long resin molded article according to this embodiment has the same operation and effect as in the first embodiment. That is, the stretch degree of the resin on the front surface side is substantially equal to that of the resin on the rear surface side. In the fourth embodiment, the cavity 2b may be filled with a bonding piece having a shape corresponding to the shape of the cavity 2b in the same manner as in the second embodiment or an embedding piece having a shape corresponding to the shape of the cavity 2b may be embedded in the end portion 2 of the long resin 1 to thereby form the cavity 2b in the same manner as in the third embodiment.

Figure 9:
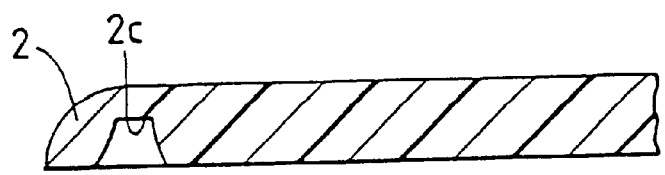
FIG. 9 is a sectional view showing an end portion of a long resin molded article which is molded by a method for molding an end of a long resin molded article according to a fifth embodiment of the present invention.

FIG. 9 is a sectional view showing an end portion of a long resin molded article molded by a method for molding an end of a long resin molded article according to a fifth embodiment of the present invention.

This embodiment has the same construction as the first embodiment, except that this embodiment is different from the first embodiment in the shape of the cavity formed in the rear surface of the end portion 2 of the long resin molded article in the same manner as in the fourth embodiment. That is, the cavity 2b in the fourth embodiment is shaped so as to have a section like a substantially quarter circular arc whereas the cavity 2c in this embodiment is shaped to have a section substantially like a trapezoid so that the surface (left surface in the drawing) opposite to the design surface of the end portion 2 of the long resin 1 is constituted by two flat surfaces which cross at an obtuse angle so as to be substantially parallel with the design surface, while the right surface is formed to be a flat surface which extends in a crosswise direction to the long resin 1. Further, the cavity 2c in this embodiment is designed so as to have a section in the widthwise direction of the long resin 1 like an oblong substantially corresponding to the horizontal sectional shape of the design surface of the end portion 2 of the long resin molded article in the same manner as the cavity 2a in the first embodiment.

In this embodiment, the second press surface 17b of the lower mold 17 in the press molds in the first embodiment is replaced by a press surface having the same shape as that of the cavity 2c to thereby make it possible to perform molding of an end of a long resin molded article in the same manner as in the first embodiment.

Further, the method for molding an end of a long resin molded article according to this embodiment has the same operation and effect as in the first embodiment. That is, the stretch degree of the resin on the front surface side is substantially equal to that of the resin on the rear surface side. In further variants of the fifth embodiment, the cavity 2c may be filled with a bonding piece having a shape corresponding to the shape of the cavity 2c in the same manner as in the second embodiment, or an embedding piece having a shape corresponding to the shape of the cavity 2c may be embedded in the end portion 2 of the long resin 1 to thereby form the cavity 2c in the same manner as in the third embodiment.

Figure 10:
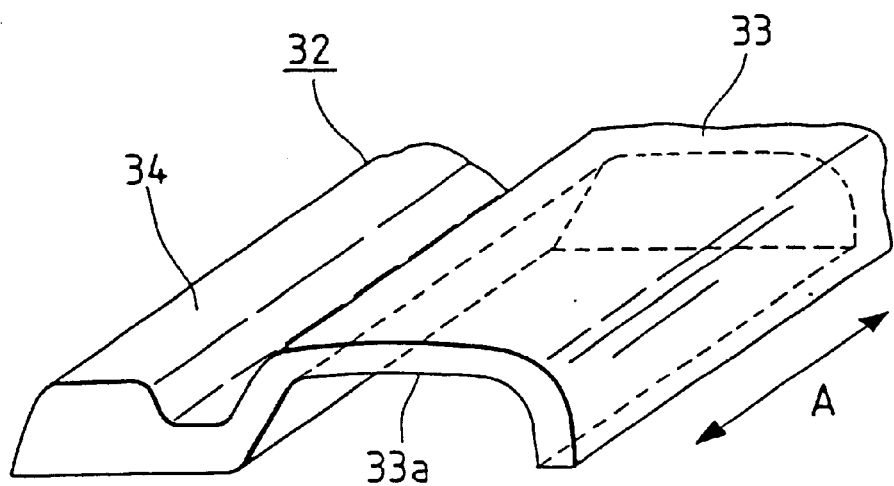
FIG. 10 is a perspective view showing an end portion of a long resin before a pressing step in a method for molding an end of a long resin molded article according to a sixth embodiment of the present invention.
Figure 11:
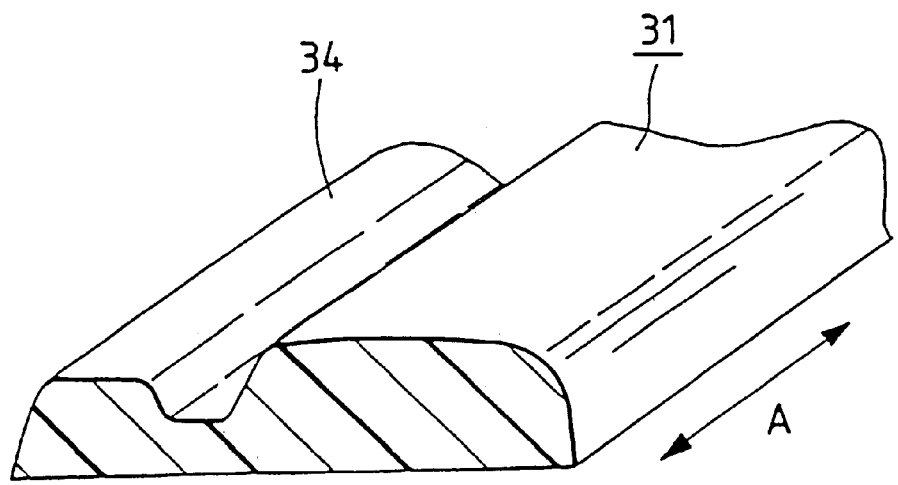
FIG. 11 is a perspective view showing a general sectional shape of the long resin before the pressing step in the method for molding an end of a long resin molded article according to the sixth embodiment of the present invention.
Figure 12:
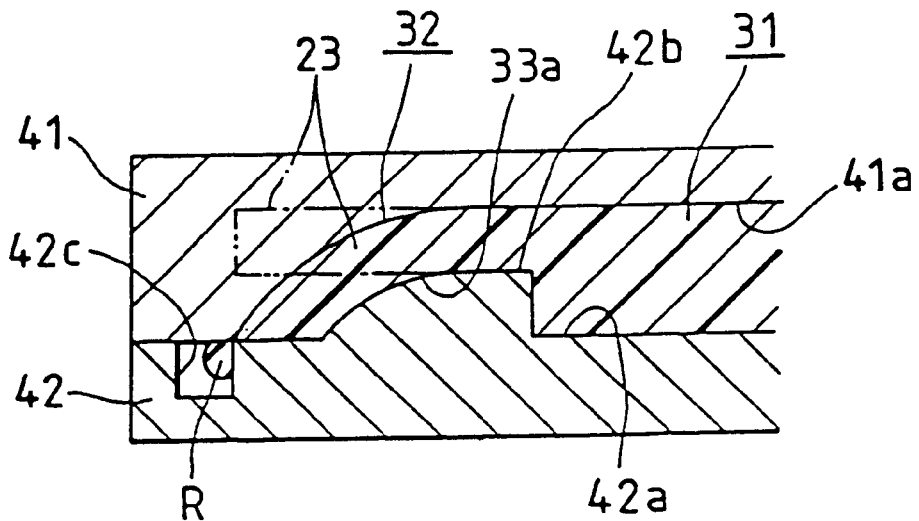
FIG. 12 is a sectional view showing a lightening cavity portion of the end portion of the long resin in the pressing step in the method for molding an end of a long resin molded article according to the sixth embodiment of the present invention.
Figure 13:
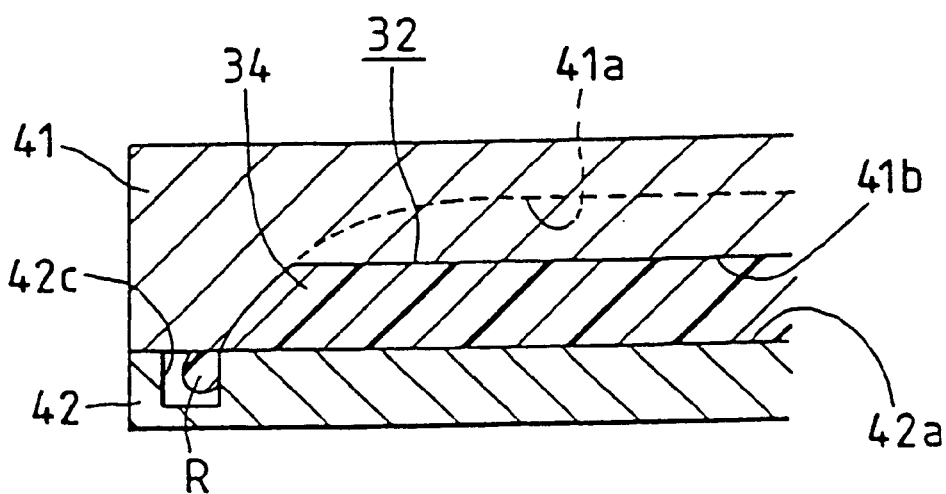
FIG. 13 is a sectional view showing a solid portion of the end portion of the long resin in the pressing step in the method for molding an end of a long resin molded article according to the sixth embodiment of the present invention.

FIG. 10 is a perspective view showing an end portion of a long resin before a pressing step in a method for molding an end of a long resin molded article according to a sixth embodiment of the present invention. FIG. 11 is a perspective view showing a general sectional shape of a long resin in the method for molding an end of a long resin molded article according to the sixth embodiment of the present invention. FIG. 12 is a sectional view showing a lightening cavity portion of an end portion of a long resin in a pressing step in the method for molding an end of a long resin molded article according to the sixth embodiment of the present invention. FIG. 13 is a sectional view showing a solid portion of an end portion of a long resin in a pressing step in the method for molding an end of a long resin molded article according to the sixth embodiment of the present invention.

As shown in FIG. 10, the method for molding an end of a long resin molded article according to this embodiment is designed so that a cavity 33a is formed in advance in a lightened portion 33 of an end portion 32 of a long resin 31 before the pressing step. That is, the end portion 32 of the long resin 31 to be subjected to the heating step and to the pressing step in this embodiment is composed of a lightened portion 33 shaped like a trapezoid in section, and a solid portion 34 integrally molded so as to be continued to a widthwise end of the lightened portion 33 and shaped like a trapezoid in section smaller than the lightened portion 33. Further, the cavity 33a shaped like a trapezoid in section slightly smaller than the lightened portion 33 is formed in the lightened portion 33. Incidentally, portions other than the end portion 32 of the long resin 31 have a sectional shape obtained by making the lightened portion 33 solid as shown in FIG. 11. The arrow A in FIGS. 10 and 11 shows the longitudinal direction of the long resin molded article.

The press molds to be used in the pressing step in this embodiment are shown in FIGS. 12 and 13. The press molds are composed of an upper mold 41 and a lower mold 42. The upper mold 41 has a first press surface 41a having a shape corresponding to the design surface of the lightened portion 33 of the end portion 32 of the long resin molded article, and a second press surface 41b having a shape corresponding to the design surface of the solid portion 34 of the end portion 32. The first press surface 41a of the upper mold 41 has substantially the same shape as the press surface 15a of the upper mold 15 in the press molds in the first embodiment shown in FIG. 1, so that the horizontal sectional surface is shaped to have substantially a trapezoidal section corresponding to the shape of the lightened portion 33, while the vertical sectional surface is shaped to be a curve which is inclined from the front surface to the rear surface. Further, the second press surface 41b of the upper mold 41 is designed in the same manner as the first press surface 41a so that the horizontal sectional surface is shaped to have substantially a trapezoidal section corresponding to the solid portion 34, while the vertical sectional surface is shaped to be a curve which is inclined from the front surface to the rear surface. On the other hand, the lower mold 42 of the press molds has a first press surface 42a having a shape corresponding to the cavity 33a formed in the rear surface of the lightened portion 33 of the end portion 32 of the long resin molded article, and a second press surface 42b which is flat so as to form a flat surface corresponding to the rear surface except the cavity 33a of the end portion 32. The first press surface 42a of the lower mold 42 extends substantially in parallel with the first press surface 41a of the upper mold 41 with a distance therebetween corresponding to the thickness of the lightened portion 33 of the long resin 31 so that the horizontal section is shaped substantially like a trapezoidal section, while the vertical section is shaped like a curve which is inclined from the front surface to the rear surface.

The method for molding an end of a long resin molded article according to this embodiment will be described below.

First, in the cavity forming step in the method for molding an end of a long resin molded article according to this embodiment, a cavity 33a extending in the longitudinal direction is formed in the rear surface of the lightened portion 33 of the end portion 32 of the long resin 31 extrusion-molded into a general sectional shape shown in FIG. 11. The cavity 33a is obtained by performing control to change the shape of an extrusion port of an extrusion molding apparatus so that only a portion corresponding to the lightened portion 33 of the end portion 32 has such a sectional shape as shown in FIG. 10, for example, when the long resin 31 is to be extrusion-molded. Then, in the heating step, the end portion 32 of the long resin 31 having the cavity 33a formed is concentratedly heated by high frequency induction heating so as to be melted or softened in the same manner as in the conventional art shown in FIG. 15. Then, in the pressing step, the heated and softened end portion 32 of the long resin 31 is pressed so as to be inclined from the front surface to the rear surface. That is, the press molds are opened so that the upper mold 41 is separated from the lower mold 42 and the heated and softened end portion 32 of the long resin 31 is mounted on a predetermined position of the lower mold 42. Incidentally, the end portion 32 of the long resin 31 is disposed as indicated by the two-dot chain line in FIG. 12 so that the longitudinal end is slightly projected from the second press surface 42b of the lower mold 42 so as to be located above the reservoir cavity 42c and so that the first press surface 42a of the lower mold 42 is fitted to the cavity 33a of the end portion 32. Further, as shown in FIGS. 12 and 13, the upper mold 41 is driven to come close to the lower mold 42 to close the press molds so that the end portion 32 of the long resin 31 is pressed while it is held between the first and second press surfaces 41a, 41b of the upper mold 41 and the first and second press surfaces 42a, 42b of the lower mold 42.

As a result, the lightened portion 33 of the end portion 32 of the long resin 31 is formed to have a predetermined end shape which is curved and inclined from the front surface to the rear surface between the first press surface 41a of the upper mold 41 and the first press surface 42a of the lower mold 42 whereas the solid portion 34 of the end portion 32 of the long resin 31 is formed so as to have a predetermined shape which is curved and inclined from the front surface to the rear surface between the second press surface 41b of the upper mold 41 and the second press surface 42b of the lower mold 42. Incidentally, the first and second press surfaces 42a and 42b of the lower mold 42 support the rear surface of the end portion 32 at the time of pressing so that the shaping of the end portion 32 is performed stably without contribution to the shaping of the end portion 32 of the long resin 31. Further, the surplus resin R at the time of pressing is reserved into the escape cavity 42c in the same manner as in the conventional art, so that the surplus resin R never exerts influence on the quality of external appearance of the design surface, or the like, in the long resin molded article which is a final product.

Then, the end portion 32 of the long resin 31 after the press molding is cooled and solidified to thereby obtain a long resin molded article having a desired end shape. In this case, the lightened portion 33 of the cooled end portion 32 of the long resin 31 which is being cooled is designed so that not only its front surface which forms the design surface is substantially parallel with the rear surface, and the length of the front surface is substantially equal to the length of the corresponding rear surface because of the presence of the cavity 33a. Accordingly, the front surface and rear surface of the lightened portion 33 of the end portion 32 of the long resin 31 are cooled and solidified at a uniform speed, so that the contraction of the resin due to the cooling occurs evenly. Accordingly, with the cooling, the lightened portion 33 of the end portion 32 of the long resin 31 is never bent toward either one of the front or the rear surfaces. In addition, because the solid portion 34 of the end portion 32 of the long resin 31 is thin, the solid portion 34 of the end portion 32 of the long resin 31 is never bent due to the cooling of either one of the front and the rear surfaces.

As described above, the method for molding an end of a long resin molded article according to the aforementioned embodiment comprises the steps of: forming a cavity 33a extending in the longitudinal direction in the rear surface of an end portion 32 of a long resin 31; heating the end portion 32 of the long resin 31; and pressing the heated end portion 32 of the long resin 31 so as to be inclined from the front surface to the rear surface.

Accordingly, in the sixth embodiment, the cavity 33a extending in the longitudinal direction is formed in the rear surface of the end portion 32 of the long resin 31 in the cavity forming step, and the end portion 32 of the long resin 31 is heated and softened, in the heating step, into a state in which it is enabled to be pressed into a predetermined shape. Further, the heated and softened end portion 32 of the long resin 31 is pressed in the pressing step to form a predetermined shape in which the front surface curves or tapers toward the rear surface. Accordingly, an end shape in which the length in the front surface of the end portion 32 is substantially equal to the length in the rear surface of the end portion 32 is formed by the presence of the cavity 33a of the end portion 32 of the long resin 31. Accordingly, the residual distortion in the front surface of the long resin molded article is substantially equalized to the residual distortion in the rear surface of the long resin molded article, so that the residual stress in the front surface and the residual distortion in the rear surface off set each other. As a result, a long resin molded article excellent and stable in quality can be produced without any disadvantage such as rebounding of the end portion 32, or the like.

Although this embodiment has shown the case where the cavity 33a is formed only in the lightened portion 33 of the end portion 32, the lightened portion having such a sectional shape may be formed in the lengthwise overall of the long resin 31 as a general sectional shape. In this case, the extrusion molding of the long resin 31 is made easier. Although this embodiment is specifically applied to a long resin molded article constituted by a lightened portion 33 and a solid portion 34, a cavity similar to the cavity 33a may be formed in an end portion 2 of a long resin molded article shaped having such a trapezoidal section as shown in the first to fifth embodiments. Furthermore, the similar lightened portion may be formed in the solid portion 34 in FIG. 10 so that press molding may be performed in the same manner as described above.

Figure 14A:
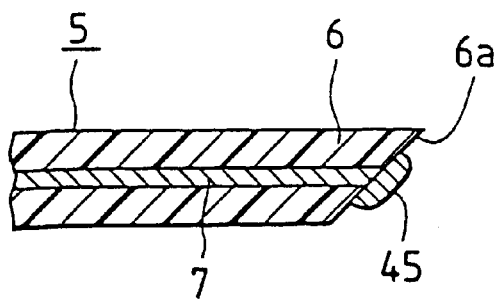
FIGS. 14(a) and 14(b) show a method for molding an end of a long resin molded article according to a seventh embodiment of the present invention.
Figure 14B:
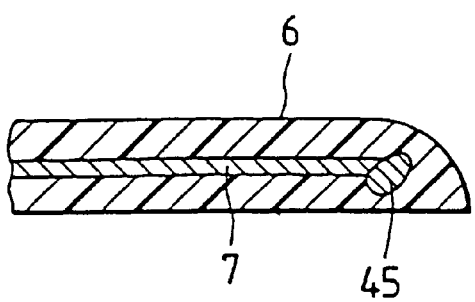

FIGS. 14(a) and 14(b) show a method for molding an end of a long resin molded article according to a seventh embodiment of the present invention. FIG. 14(a) shows an end portion of a long resin after a sealing step; and FIG. 14(b) shows the end portion of the long resin after a pressing step.

This embodiment relates to a method for molding an end portion 6 of a long resin 5 in which an insert 7 of a metal such as aluminum, or the like, is embedded continuously in the longitudinal direction by extrusion molding. This embodiment is designed so that a portion corresponding to an end portion of the insert 7 in the end portion 6 of the long resin 5 is sealed with a sealing material 45 of predetermined resin in the sealing step. That is, after extrusion molding, the long resin 5 is cut into a predetermined length and an end of the end portion 6 is cut obliquely. In this case, the insert 7 is often exposed from the end surface of the end portion 6. Therefore, as shown in FIG. 14(a), in the sealing step in this embodiment, the end of the insert 7 exposed from the end surface of the end portion 6 of the long resin is sealed with the sealing material 45. Styrene type dope cement, for example, or any other suitable adhesive agent known to those of skill in the art may be used as the sealing material 45.

Further, in this embodiment, the end portion 6 of the long resin 5 is concentratedly heated by high frequency induction heating in the heating step after the sealing step. Because the end surface 6a of the end portion 6 is securely covered with the sealing material 45 to seal the end of the insert 7, the insert 7 is never exposed to the outside by heating and softening the end portion 6 even in the case where the end portion 6 of the long resin 5 is melted. Accordingly, no spark is generated between the electrodes 11, 12 of the high frequency induction heating machine and the metal insert 7. Further, the thus heated end portion 6 of the long resin 5 is pressed into a predetermined shape in the pressing step. Incidentally, the conventional method shown in FIGS. 15 and 16(a) to 16(c) may be used for the heating and pressing steps. After the pressing step, as shown in FIG. 14(b), the sealing material 45 is enclosed in the inside of the resin in the end portion 6 of the long resin 5 so that the sealing material 45 is prevented from being exposed to the outside so as not to exert influence on the quality of external appearance of the end portion 6.

As described above, the method for molding an end of a long resin molded article according to this embodiment comprises the steps of: sealing, with a sealing resin material 45, an exposed portion of a metal insert 7 of an end portion 6 of a long resin 5 having the insert 7 embedded continuously in the longitudinal direction; heating the end portion 6 of the long resin 5 by high frequency induction heating; and pressing the heated end portion 6 of the long resin 5 into a predetermined shape.

Accordingly, in the seventh embodiment, the exposed portion of the insert 7 in the end portion 6 of the long resin 5 is sealed with the sealing material 45 in the sealing step; the end portion 6 of the long resin 5 is heated by high frequency induction heating in the heating step; and the heated end portion 6 of the long resin 5 is pressed into a predetermined shape in the pressing step. Thus, even in the case where high frequency induction heating is used for heating the end portion 6 of the long resin 5, no spark is generated between the electrodes 11, 12 of the high frequency induction heating machine and the metal insert 7 because the insert 7 in the end portion 6 is sealed with the sealing material 45 so as not to be exposed to the outside. As a result, unlike a conventional case, the high frequency induction heating machine is prevented from stopping so as not to make it difficult to continue pressing operation before the temperature of the end portion 6 of the long resin 5 reaches a press-enabled point. Even in the case where the end portion 6 of the long resin 5 having the insert 7 embedded therein is heated by high frequency induction heating, heating operation can be performed smoothly.

Incidentally, this embodiment can be applied to the case where an end portion of a long resin molded article having an insert 7 embedded therein is molded in the first to sixth embodiments. In this case, the respective embodiments can be designed so that the sealing step of sealing a portion corresponding to the end portion of the insert 7 in the end portion of the long resin with the sealing resin material 45 is provided before the heating step in each embodiment. In this case, in addition to the effect of this embodiment, the effects of the respective embodiments can be obtained.

Although the long resin molded article in the aforementioned embodiments is adapted for a use such as a side molding for an automobile, or the like, the embodiments can be applied specifically to any long resin molded article if the end portion of the long resin molded article is required to be molded into a predetermined shape by hot press. Although the end of the insert 7 is not always exposed to the outside when the long resin is cut, it is preferable that the sealing material is applied to the portion corresponding to the end of the insert in all articles because there is a possibility that the end of the insert 7 may be exposed to the outside in the heating step.

As described above, according to the present invention, in the heating step, the end portion of the long resin is heated and softened so as to be enabled to be pressed into a predetermined shape. Further, in the pressing step, the heated and softened end portion of the long resin is pressed not only to form a predetermined shape in which the front surface goes toward the rear surface, but also to form, in the rear surface, a cavity having a shape corresponding to the shape of the front surface so that the end portion has a shape in which the stretch degree of the resin of the front surface side is set substantially equal to that of the resin of the rear surface side. As a result, the residual distortion in the front surface of the long resin molded article and the residual distortion in the rear surface of the same become substantially equal, so that the residual stress in the front surface and the residual stress in the rear surface offset each other. Consequently, a long resin molded article which is excellent and stable in quality can be produced without any disadvantage such as rebounding of the end portion.

Further, the aforementioned cavity of the end portion of the long resin can be filled with the embedding piece. Accordingly, when, for example, the long resin is applied specifically to a side molding for an automobile, the embedding piece embedded in the cavity of the end portion can be used as means for supporting a pressure sensitive adhesive double coated tape to be stuck to a vehicle body, so that the adhesive force of the side molding to the vehicle body can be increased. Furthermore, there arises an effect that the strength of the end portion of the long resin molded article can be increased by the embedding piece.

According to another aspect of the present invention, an end shape in which the length in the front surface of the end portion becomes substantially equal to the length in the rear surface of the same is formed by the presence of the cavity in the end portion of the long resin. Accordingly, the residual distortion in the front surface of the long resin molded article and the residual distortion in the rear surface of the same become substantially even, so that the residual stress in the front surface and the residual stress in the rear surface offset each other. As a result, a long resin molded article excellent and stable in quality can be produced without any disadvantage such as rebounding of the end portion.

According to still another aspect of the present invention, a portion corresponding to the end portion of the insert in the end portion of the long resin is sealed with the sealing material in the sealing step; the end portion of the long resin is heated by high frequency induction heating in the heating step; and the heated end portion of the long resin is pressed into a predetermined shape in the pressing step. Accordingly, even in the case where high frequency induction heating is used for heating the end portion of the long resin, no spark is generated between the electrodes of the high frequency induction heating machine and the metal insert because the insert in the end portion is sealed with the sealing material so as not to be exposed to the outside. As a result, unlike a conventional case, the high frequency induction heating machine is prevented from stopping so as not to make it difficult to continue pressing operation before the temperature of the end portion of the long resin reaches a press-enabled point. Accordingly, even in the case where the end portion of the long resin having the insert embedded therein is heated by high frequency induction heating, the heating operation can be performed smoothly.

What is claimed is:

1. A method for molding a long resin molded article, comprising:

i) preparing a precursor by extrusion molding, the precursor having a first face configured and positioned along its longitudinal aspect and a second face configured and positioned along its longitudinal aspect substantially parallel to said first face;

ii) cutting an end portion of the precursor to form an oblique face, said oblique face configured and positioned to integrally extend between said first face and said second face;

iii) heating said end portion including said oblique face and a portion of said first face; and iv) pressing and deforming said first face with a first press surface of a Press mold to form a design surface, such that said oblique face lies substantially in the same plane as said second face, and pressing and deforming said second face to form a cavity having a circular arc-shaped surface which is substantially parallel to a curved surface of said design surface wherein said cavity is formed by embedding a second Press surface of said press mold into said second face.

2. The method according to claim 1, further comprising setting a convex bonding piece having a shape corresponding to the shape of said cavity within said cavity so as to substantially fill said cavity.

3. The method according to claim 1, wherein said heating is provided by high frequency induction heating.

4. The method according to claim 1, further comprising cutting the end portion of the long resin molded article obliquely before heating said end portion.

5. The method according to claim 1, further comprising collecting free surplus resin generated by said pressing and deforming said first face or said oblique face.

6. The method according to claim 1, wherein the pressing is carried out by a press mold comprising an upper mold and a lower mold, wherein said upper mold is separated from said lower mold, the heated and softened end portion of the precursor is positioned in said lower mold, and the upper and lower molds are closed so as to carry out said pressing.

7. The method according to claim 1, wherein said design surface and said cavity are formed substantially simultaneously.

8. The method according to claim 1, further comprising embedding a metal insert in said long resin molded article longitudinally.

9. The method according to claim 8, further comprising sealing a portion of said end portion of said long resin molded article corresponding to an end portion of said insert with a sealing material before heating said end portion.

* * * * *